United States Patent [19]

Baniel

[11] 4,324,774
[45] Apr. 13, 1982

[54] METHOD FOR THE MANUFACTURE OF DEFLUORINATED PHOSPHATIC PRODUCTS

[75] Inventor: Avraham M. Baniel, Jerusalem, Israel

[73] Assignee: Fertilizer Development S.A., Switzerland

[21] Appl. No.: 169,765

[22] Filed: Jul. 17, 1980

[51] Int. Cl.$^3$ ............................................. C01B 25/16
[52] U.S. Cl. ............................... 423/321 R; 423/264; 423/308
[58] Field of Search .................. 423/308, 309, 321 R, 423/264

[56] References Cited

U.S. PATENT DOCUMENTS

| | | | |
|---|---|---|---|
| 3,328,118 | 6/1967 | Sasakura | 423/309 |
| 3,661,513 | 5/1972 | Barker | 423/309 |
| 4,160,657 | 7/1979 | Drechsel | 423/309 |

OTHER PUBLICATIONS

Slack, *Phosphoric Acid*, vol. 1, Part I, (1968), Marcel Dekker, Inc., New York, pp. 48–50.
Kirk–Othmer, *Encyclopedia of Chemical Technology*, Second Edition, vol. 15, copyright 1968 by John Wily & Sons, Inc., pp. 239 and 240.

Primary Examiner—O. R. Vertiz
Assistant Examiner—Wayne A. Langel
Attorney, Agent, or Firm—Bacon & Thomas

[57] ABSTRACT

The present invention relates to a method for the manufacture of phosphatic products having a very low fluorine content from wet process phosphoric acid.

According to the invention the fluorine in the wet process phosphoric acid is removed in the form of potassium fluosilicate, by the reaction of its fluoride components with $KH_2PO_4$ formed insitu from KCl or $K_2SO_4$ and an amine phosphate salt, the latter resulting from phosphoric acid and an amine selected from the group consisting of a primary—secondary—or tertiary aliphatic amine, a quaternary ammonium base or mixtures thereof. Examples of suitable amines and quaternary ammonium bases are: tri-n-octylamine, ethyl di-n-octylamine, di-n-dodecylamine, di-n-decylamine, tricaprylamine, tri-iso-octylamine etc. The amine constituent appears in the form of a water-immiscible liquid, preferably in conjunction with an organic solvent in which the aliphatic amines and their salts are soluble.

The method is very flexible and enables the production of a range of upgraded phosphatic products of different purity grades according to the specific requirement, at yields which are substantially theoretical.

11 Claims, 1 Drawing Figure

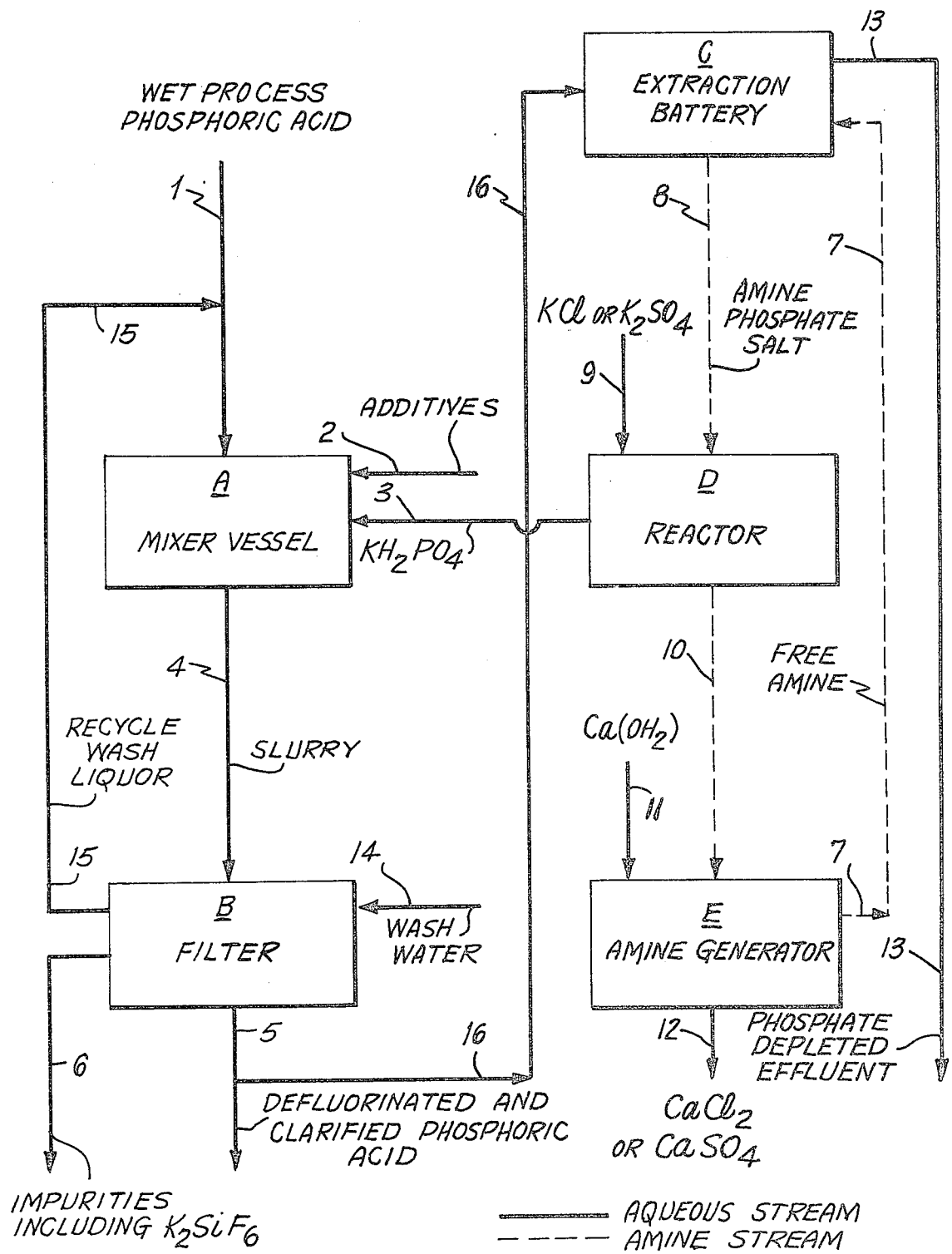

METHOD FOR THE MANUFACTURE OF DEFLUORINATED PHOSPHATIC PRODUCTS

The present invention relates to a method for the manufacture of phosphatic products, having a very low fluorine content, from wet process phosphoric acid. It relates more particularly to a method for the defluorination of wet process phosphoric acid obtained by decomposition of phosphate rock by sulfuric acid (referred to hereinafter by the widely accepted abbreviation WPA).

WPA is the most abundant source of phosphoric acid. Its main use is in the fertilizer industry wherein in most of the cases, the cation impurities (such as Fe, Al, Mg, Zb, Cu, V etc.) as well as the anion impurities (such as $F^-$, $Cl^-$, $SO_4^{--}$ etc.) of the phosphoric acid do not interfere in its use. For special uses such as in the feed and in the food industry where strict composition standards are required, the thermal phosphoric acid produced from elemental phosphorus has been utilized. However, thermal phosphoric acid is a very expensive product and would be selected generally for a rather limited number of uses.

In the last fifteen years several processes have been developed for the manufacture of purified phosphoric acid by solvent extraction. According to these processes, phosphoric acid is extracted from impure dissolution liquors obtained by decomposition of phosphate rocks with hydrochloric acid or nitric acid or directly from WPA, using various groups of organic solvents mostly water-immiscible. The purified phosphoric acids obtained are substantially free of most of the cation impurities and to a certain extent free of anion impurities and substitute thermal phosphoric acid in various uses.

Examples of such uses are in the manufacture of sodium polyphosphate (detergent industry), metal treatment, dicalcium phosphate as feed additive etc.

Fluorine is one of the main impurities in WPA (53% by wt $P_2O_5$) being present in amounts between 1.5 to 4% by wt depending on the source of rock phosphate. Its removal is actually required in most industrial phosphates, the extent of the removal determining the scope of product utilization. Two main methods are known for fluorine removal from WPA, one is based on consumption of thermal energy wherein fluorine is largely expelled by evaporation and the other is based on fluoride precipitation.

Fluorine expulsion by evaporation, generally in the form of $SiF_4$ and HF is a rather expensive thermal operation which involves high energy requirements. It has also the disadvantage that some polyphosphoric acid may be produced during the heating operation.

Fluoride precipitation involves the addition of reagents such as various alkali salts (NaCl, KCl, $Na_2SO_4$, $Na_2CO_3$, etc.) thus producing the corresponding insoluble fluosilicates. In a recent review (C.A. 81, 65683) 78-79% defluorination of WPA is claimed to be achieved by addition of NaCl or KCl using 210% and 150% respectively of the stoichiometrical amounts required for the fluosilicate salts precipitation. Although the fluoride precipitation method leads to a phosphoric acid with a relatively low fluorine content, it has the disadvantage that it introduces a foreign impurity in the form of $Cl^-$ or $SO_4^{--}$ ion. Moreover chloride is a very undesirable impurity due to the difficulty of removing it and also to the increased corrosivity of WPA containing it. For this reason suggestions were made to utilize phosphate salts such as $NaPO_2.H_2O.Na_3PO_4$, mixtures of $Na_2HPO_4$ and $CaHPO_4$ and also alkali hydroxides or carbonates, where no anion impurity is introduced into the phosphoric acid. However, these reagents are rather expensive, their interest being only for laboratory or other similar small scale applications.

When a range of phosphatic products is made by one manufacturer, as is frequently the case, the purity requirement may differ widely between various products. For example a feed grade dicalcium phosphate has lower purity requirements than dicalcium phosphate for human use; however WPA such as commonly produced cannot be utilized even for feed grade dicalcium phosphate. Thus if the manufacturer purifies WPA and uses the pure acid as a single source for all phosphatic products, it will have to satisfy the purity requirements of the product which needs the highest ones. The consequence is that with respect to other products, the WPA will have been over-purified which means that unnecessary costs are sustained.

It is an object of the present invention to provide an efficient integrated method for the manufacture of upgraded phosphatic materials from WPA. It is another object of the present invention to provide an efficient integrated method for the defluorination of WPA. It is yet another object of the present invention to provide an efficient integrated method for the defluorination of WPA by fluorine precipitation without introducing other anion impurities in the phosphoric acid. The invention consists of a method for the manufacture of upgraded phosphatic products having a very low fluorine content from wet process phosphoric acid (WPA), wherein the fluorine is removed as potassium fluosilicate by its precipitation with $KH_2PO_4$, the method being characterized by the fact that the required amount of $KH_2PO_4$ is formed in-situ by reacting an amine phosphate salt which results from the addition of a calculated amount of amine to an equivalent amount of defluorinated phosphoric acid obtained from WPA, to form a corresponding amine phosphate salt, said reaction being carried out by a potassium salt selected from the group consisting of KCl and $K_2SO_4$, the amine being substantially comprised in a water-immiscible liquid system (the term "water-immiscible liquid system" having the meaning hereinafter assigned) selected from the group consisting of primary, secondary, tertiary, aliphatic amine or a quaternary ammonium base comprising at least 7 carbon atoms directly attached to the nitrogen thereof, the defluorinated phosphoric acid being subsequently transformed into upgraded phosphatic products. The method according to the present invention has a great advantage that also other impurities are removed by the same operation of fluosilicate precipitation and filtration. This object is achieved by adding various reagents known in the art for combining or precipitating impurity constituents of the acid, (e.g. active carbon or active silica for organic matter, phosphate rock or calcium hydroxide to neutralize any free sulfuric acid etc.) in the vessel wherein the $KH_2PO_4$ is introduced. Thus the defluorinated phosphoric acid obtained will also be free of the bulk of other impurities normally present in WPA and at the same time being limpid, transparent and of an improved colour. The phosphoric acid obtained can be utilized for many purposes for which up to now purified phosphoric acid obtained by solvent extraction has been utilized. A typical example of such use is in the manufacture of feed grade dicalcium phosphate, wherein a $P_2O_5$: F ratio of the order of 200 or higher is required.

As known from the solubility data, potassium fluosilicate is among the most insoluble fluoride-containing salts. Thus by its precipitation and separation from the WPA, the desired result of phosphoric acid defluorination can be achieved. In addition to the lower solubility of the potassium salt compared with the corresponding sodium salt, it has also an advantage that the fluosilicate salt precipitation can easily be accomplished with substantially stoichiometrical amounts of potassium ions. Enough active $SiO_2$ is present in most phosphate rocks to ensure the conversion of fluoride anions to fluosilicate anions in the WPA made from these rocks. In those cases wherein there is some deficiency in silicon in WPA compared with the stoichiometrical requirements for fluosilicate formation, the balance of silicon may be introduced in the form of active silica or finely ground quartz, alongside other reagents added to the starting WPA.

Whilst the present invention is primarily concerned with the removal of fluorine from WPA, the method may be optionally applied also for purifying the WPA from another impurity: $SO_4^{--}$ ions. Fortunately and usefully the aliphatic amine solvents used in the method according to the present invention are also capable of extracting the $SO_4^{--}$ ion through the formation of amine sulfate salts and therefore the method may result in a substantially fluorine-free phosphoric acid which is also substantially free of sulfate.

The WPA starting material to be defluorinated may be any phosphoric acid, independent of the source of phosphate rock. Although the method of the present invention does not appear to be dependent on the concentration of the WPA, it is preferred to utilize a WPA containing from 10 to 54% $P_2O_5$, particularly in the range of about 25% to about 40% which is the range of concentration of "filter acids" obtained in commercial processes on filtration of the reaction mixture to separate WPA from the by-product gypsum. This is also most practical from an economical point of view since by utilizing "the filter acid", the costly concentration operation is always simplified and for some uses may be avoided altogether.

The method according to the present invention for the fluorine removal from WPA may be carried out batchwise. In this case, the extraction operation is carried out by stirring the corresponding portion of the defluorinated phosphoric acid with the amine system followed by separation of the two phases by decantation. However, the method is most preferably carried out in a continuous operation by any of the known counter-current liquid-liquid contacting methods.

The purification of phosphoric acid by solvent extraction is now recognized as a well-known method of operation. In the known methods the impure phosphoric acid is contacted with one of the water-immiscible solvents, and leads to a selective extraction either of phosphoric acid from impurities present therein or of the extraction of specific impurities from the said impure phosphoric acid. While in the prior art methods the solvent contacts the impure phosphoric acid, it is an essential feature of the method according to the present invention that only a part of the purified (clarified and substantially fluoride-free and optionally sulfate-free) phosphoric acid is contacted with a stoichiometrically calculated amount of a certain type of amine to form a corresponding amount of amine phosphate salt. The amine phosphate salt after reacting with an equivalent amount of KCl or $K_2SO_4$ will generate the corresponding amount of $KH_2PO_4$ which is required for the precipitation of the fluoride salt. The amount of amine to be used for the method according to the present invention can be readily determined, based on the fluoride content of the WPA, in order to be transformed into potassium fluosilicate salt.

Solvent extraction with amines has now become a versatile method. Since 1952 a wide range of amines and related organonitrogen compounds have been studied at Oak Ridge National Laboratory, primarily for use in recovery of uranium. In a review by C. F. Coleman et al (Industrial and Engineering Chemistry, Vol. 50, No. 12, December 1958, pages 1756–62) the solvent extraction with alkyl amines, their general extraction behaviour as well as control of extraction by the amine structure is described.

The aliphatic amines suitable for the present invention, should substantially comprise a water-immiscible system and also form the corresponding water insoluble amine salts. Generally these aliphatic amines would be selected from primary, secondary, tertiary amines or quaternary ammonium bases which comprise at least two aliphatic hydrophobic groups, each containing at least seven carbon atoms directly attached to the nitrogen thereof. Mixtures of the amines or amines and the quaternary ammonium bases may also be used. Of particular interest are the secondary and tertiary aliphatic amines having two aliphatic hydrocarbon groups attached to the nitrogen atom, each containing seven to fifteen carbon atoms. The aliphatic hydrogen groups may be branch chain groups or straight chain groups. When a tertiary aliphatic amine is used, the third group attached to the nitrogen atom may contain any number of carbon atoms but preferably should not contain more than 18 carbon atoms. Further, the hydroxyl, carboxyl, halogen, nitro, alkoxy and sulphoryl substituted compounds may, in most cases, be used so long as at least two of the groups are hydrophobic, thus rendering the amine water-immiscible. The preferred amines may be represented by the general formula $R_1 R_2 R_3 N$, in which $R_1$ and $R_2$ are saturated or ethylenically unsaturated aliphatic groups each containing from 7 to 15 carbon atoms while $R_3$ is a hydrogen atom or a saturated or ethylenically unsaturated aliphatic hydrocarbon group containing from 1 to 18 carbon atoms.

The same criteria are applicable to the amine salts, amine phosphate, amine chloride and optionally amine sulfate which are formed in the method according to the present invention.

The nature of the groups present in the tertiary amines and amine salts is likewise applicable to the quaternary ammonium salts and bases. The fourth group attached to the nitrogen atom in the quaternary ammonium salts and bases may contain any number of carbon atoms but preferably should not contain more than fifteen carbon atoms.

The term "water-immiscible liquid system" as used herein with respect to the amines including the quaternary ammonium compounds, does not imply a complete insolubility of the organic towards the aqueous phase. It merely requires that the system, which comprises a substantially water-insoluble amine or a substantially water-insoluble salt thereof, should be sufficiently immiscible, with the WPA phase or other aqueous phase in order to allow physical separation of the liquid into two distinct phases.

Representative examples of amines and quaternary ammonium bases described above and suitable for the method according to the present invention are: tri-n-octylamine, methyl di-n-octylamine, di-n-dodecylamine, tri-n-dodecylamine, di-n-decylamine, dimethyldi-n-dodecyl ammonium chloride, tricaprylamine, tri-iso-octylamine, tri-lauryl amine etc.

Although the amines are known to be capable of extracting in the undiluted form, it is preferred to utilize them in conjunction with an organic diluent which permits greater ease in handling and in the phase separation of the extraction operation. In general these organic diluents are organic solvents, in which the aliphatic amines and their salts or quaternary ammonium bases and their salts are quite soluble and which in addition are water-immiscible. A wide range of organic solvents, which fulfil the above requirements are readily commercially available. Examples of such organic solvents are: kerosene, naphta, xylene, benzene, toluene, chloroform etc.

As also mentioned in the above-cited review of C. F. Coleman et al on solvent extraction by amines, in some instances it is highly desirable to modify the behaviour of the organic diluent by the addition of minor amounts of suitable polar additives in order to increase the solubility of the amine or amine salt in certain organic solvents. Preferred additives are long chain aliphatic alcohols containing between 6 to 15 carbon atoms. Suitable alcohols are for example: 1-dodecanol, tridecanol, 1-octanol, 1-hexanol etc.

The phosphoric acid which has been extracted from the defluorinated phosphoric acid into the amine system phase, is reacted with a corresponding amount of potassium salt selected from the group of KCl and $K_2SO_4$, generating the equivalent amount of $KH_2PO_4$. The KCl or $K_2SO_4$ may be used in a solid or preferably in a concentrated aqueous solution form thus obtaining also a concentrated solution of the generated monopotassium phosphate. KCl is a common fertilizer raw material which is readily available and represents the least expensive source of potassium ions. In contrast to the known methods which utilize KCl as a reagent for the fluosilicate precipitation, but leaves the chloride ion in the defluorinated phosphoric acid, in the method according to the present invention, the chloride is bound first as an amine salt as a product of the reaction of KCl with the amine phosphate salt and subsequently by regeneration of the amine, is discarded as effluent.

Alternatively $K_2SO_4$ may also conveniently be used as a reagent for the stripping of amine phosphate salt. Although this reagent is more expensive than potassium chloride, there are cases when it is available in the plant. The amine-sulfate is subsequently decomposed by an alkali, thus regenerating the amine. The calcium sulphate formed, is discarded together with the impurities filtered from the WPA, so that the defluorinated phosphoric acid is not contaminated by the $SO_4^{--}$ originating in $K_2SO_4$.

Though sodium compounds are less effective for defluorination via sodium fluosilicate precipitation, they may be used in complete analogy to potassium as described in the present invention provided that the excess of sodium ions that remains in the treated acid is not detrimental for its subsequent use. To illustrate: for a given extent of fluosilicate precipitation the ratio of Na-concentration to K-concentration in the acid, expressed in equivalents, must be approximately 15 to 18 depending on concentration and on temperature. In the case of a WPA of 30% $P_2O_5$ containing 1% F, the precipitation of 89% of the F is obtained to $P_2O_5$: F=260 with 1 g/l $K^+$ in the defluorinated acid; for the same degree of defluorination about 9.5 g/l $Na^+$ are necessary; the usage of NaCl compared to KCl to make the amounts of the monoalkali phosphate for this degree of defluorination is approximately 2.7–2.8 to 1. It is obvious that usually the potassium salt is superior to the sodium salt.

It is also possible to use both potassium and sodium. However to secure that the sodium is effectively used a ratio of $Na^+$ to $K^+$ (expressed in equivalents) of 16 is necessary. Obviously little can be gained in this way compared to the use of Na alone.

Reference is now made to the attached drawing showing for the purpose of illustration, a flow sheet representative of the procedure for the defluorination of the WPA according to the present invention. WPA (1) is introduced into a mixer vessel (A), wherein it reacts with various known additives (active carbon, active silica if deficiency of Si ion is required, calcium hydroxide or rock phosphate to react with free $SO_4^{--}$ etc.) introduced through stream 2. In the same vessel A, enters through stream 3, the in-situ generated $KH_2PO_4$ which is formed in vessel D. The slurry (4) is filtered and washed with tap water (14) on filter (B) resulting in a precipitate (6) of the impurities including the $K_2SiF_6$ and a solution of defluorinated and clarified phosphoric acid (5). The liquor resulted by washing (15) is recycled, entering in the mixer vessel A. A calculated amount of the defluorinated and clarified phosphoric acid (obtained in stream 5) is conveyed (stream 16) into an extraction battery C wherein it comes in contact with an equivalent amount of amine solvent solution (7) resulting in an amine phosphate salt solution (8) and a depleted phosphate aqueous effluent (13). The amine phosphate salt is reacted with a stoichiometric amount of KCl or $K_2SO_4$ (9) resulting in $KH_2PO_4$ (3) (which enters in vessel A for the formation of $K_2SiF_6$) and a solution of $A_1HCl$ or $A_1H_2SO_4$ (10). The amine salt solution ($A_1HCl$ or $A_1H_2SO_4$) enters into vessel E, wherein the free amine (7) is generated by a solution of $Ca(OH)_2$: the effluent obtained consists of $CaCl_2$ (or $CaSO_4$) is discarded (12). The free amine solution (stream 7) is recycled to the process entering into the extraction system C.

According to another embodiment of the present invention, which is based on the same approach, it is also possible to produce a desulfated and defluorinated clarified phosphoric acid. In this case the defluorinated phosphoric acid would contact a calculated amount of amine phosphate solution corresponding to the sulfate and fluoride content. After reacting with KCl (or $K_2SO_4$) the regeneration of the amine would be carried out on a solution of amine chloride and amine sulfate solution. The clarified phosphoric acid solution produced according to the method of the present invention, being substantially free of the fluoride ion considered as one of the most undesirable impurities of WPA, would be perfectly adequate for the manufacture of feed grade dicalcium phosphate. It goes without saying that utilizing the amine system for the generation of the $KH_2PO_4$, other impurities present in the WPA ($SO_4^{--}$, $Cl^-$, $Fe^{+++}$ present as anionic complex etc.) will also be removed and discarded. This additional purification is actually performed without any additional equipment or operation, the only expense being those of costs for the commonly available reagents which are quite inexpensive. Since the phosphoric acid solution obtained would be free of the bulk of the impurities present in the WPA, it can be concentrated in a multiple effect evaporation system without causing incrustation in the concentration system. Other outlets for the clarified defluorinated (and optionally desulfated) phosphoric acid may be for the manufacture of various phosphate salts or for shipment as concentrated phosphoric acid.

If desired, the defluorinated phosphoric acid solution obtained may be further purified to a food-grade product by solvent extraction. Whereas the starting material is already substantially fluoride-free and also purified from the bulk of impurities, the entire extraction operation will be much simplified. This constitutes an additional advantage of the method according to the present invention, wherein a phosphatic product which does not require a high purity standard, such as feed-grade dicalcium phosphate, will have been produced without performing a solvent extraction operation on the entire amount of impure WPA.

According to still another embodiment of the present invention, partial phosphoric acid extraction from the defluorinated product by the amine solution may be repeated to obtain one or more phosphate streams. The residual defluorinated phosphoric acid product will maintain its suitability for feed-grade dicalcium phosphate, while the amine phosphate salt can be directly converted to high purity phosphate salts, by the reaction with alkali hydroxides, carbonates or chlorides as known in the art. These high purity phosphate salts can be obtained in advantageously high concentrations.

Summing up, the method according to the present invention provides in toto a co-ordinated economic way for the manufacture of up-graded phosphatic products. Among the various advantages the following may be pointed out:
1. The substantial removal of fluorine from WPA is achieved without utilizing thermal energy.
2. The method can be applied on "filter acid" solution of WPA, which is the most inexpensive form of phosphoric acid.
3. No foreign anion impurity is introduced in the defluorinated phosphoric acid.
4. The method can be easily integrated with fertilizer plants, using available, inexpensive reagents, and diversifying the range of products.
5. The yield of the upgraded recovered $P_2O_5$ value is practically theoretical.
6. The method is very flexible and enables the production of a range of upgraded phosphatic products of different purity grades according to market requirements. If desired, a part of the defluorinated product may be refined to a food-grade phosphoric acid, by means of any of the known solvent extraction methods and with substantial savings in investment and in operation compared to the application of these methods directly to WPA.

In order to further and fully illustrate the nature of this invention and the manner of practising it, the following examples are presented to help understand the practice of the process and no limitation should be understood therefrom. The percentages are given in weight unless otherwise specified.

EXAMPLE 1

Part I. An amount of 1,000 g. of WPA containing 25.2% $P_2O_5$ 1.82% F and 3.1% $SO_4^{--}$ was introduced into a vessel provided with a stirrer. The following additives were consequently introduced and mixed for the times specified below:
(a) 18 g. of phosphate rock (34% $P_2O_5$) ground to pass 200 mesh (Tyler size), for 5 minutes.
(b) 15 g. of diatomaceous earth, for 10 minutes.
(c) 146 g. of a 30% solution of $KH_2PO_4$, for 10 minutes.

The slurry was filtered and washed with 100 g. of water. An amount of 1170 g. of filtrate was obtained containing a total of 282.2 g. $P_2O_5$ compared to the initial amount of 252 g. $P_2O_5$. The difference is accounted for by the 24.2 g. of recycled $P_2O_5$ introduced in the form of $KH_2PO_4$ (produced as explained in part II below from the defluorinated acid) and by the 6 g. of $P_2O_5$ in form of $H_3PO_4$ generated from the reaction of free sulfuric acid with the added phosphate rock. The content of $F^-$ in the filtrate amounted to 542 mg i.e. $P_2O_5$ to F ratio was slightly over 500:1 by weight. The concentration of the filtrate was 24.3% $P_2O_5$, only slightly lower than the original WPA.

Part II An amount of 100 g. of the purified acid obtained as described in part I, was contacted by 890 g. of solvent consisting of: 20% tri-decylamine, 75% xylene, and 5% decanol. The aqueous phase that separated, contained only traces of $P_2O_5$ and was rejected. The organic phase containing amine phosphate, was contacted with an aqueous solution consisting of 100 g. $H_2O$ and 26 g. KCl (technical grade). The aqueous phase that separated contained $KH_2PO_4$ and was used in step (c) in part I of this Example.

The organic phase loaded with chloride ions (and small amounts of impurities deriving from the WPA) was contacted with an aqueous suspension containing 11.35 g. CaO and the aqueous layer discarded. The organic phase obtained contained a fully regenerated amine and was ready for reuse.

Part III An amount of 500 g. of the purified acid obtained in part II was evaporated to 54% $P_2O_5$. The product had only a very slight turbidity. This illustrates the usefulness of the defluorination process according to the present invention, for making a high grade fertilizer acid for shipping.

Part IV An amount of 500 g. of the phosphoric acid obtained as described in part I was extracted by n-butanol according to the known method to obtain 320 g. of raffinate of 19% $P_2O_5$ and 280 g. of extract of 21.7% $P_2O_5$ (about 50% of the initial acid in each phase).

The raffinate was neutralized by an aqueous suspension of $Ca(OH)_2$ in the known manner to obtain dicalcium phosphate dihydrate. This product contained 40.8% $P_2O_5$ and only 0.018% F and was of excellent feed grade quality.

The extract was concentrated to 75% $H_3PO_4$ and bleached by active carbon as known in the art. The phosphoric acid obtained was colourless and contained less than 0.3% of impurities.

EXAMPLE 2

Part I of this Example was practically the same as Part I of Example 1.

Part II The total quantity of the acid obtained in Part I was contacted with 970 g. of the same solvent composition described in Part II of Example 1. The solvent extract contained in addition to the amine phosphate all of the $SO_4^{--}$, residual $F^-$ and other impurities. The rest of the operations was as in Part II of the preceding Example.

Part III Was similar to Part IV of the preceding Example. The phosphoric acid obtained in this case from the extract, fully satisfied food grade requirements as defined by the U.S.A. Official Standards.

EXAMPLE 3

Part I and Part II were as in Example 2.

Part III The phosphoric acid obtained in Part II was extracted fully by an amine solvent which had the same composition as described in Example 1, and the solvent extract divided in two parts. One part was treated by KCl as described in Part II of Example 1, to obtain a concentrated solution of $KH_2PO_4$ which was crystallized by known methods. The product obtained satisfied food grade requirements and can be used e.g. as nutrient in fermentation processes.

The other part of solvent extract containing the amine phosphate was contacted with a 20% $NH_4OH$ solution. A pure ammonium phosphate solution was obtained and the amine solvent concurrently regenerated.

I claim:

1. A method for removal of fluorine from wet-process phosphoric acid (WPA) prepared by acidulation of phosphate rock with sulfuric acid comprising reacting wet-process phosphoric acid with $KH_2PO_4$ in a first unit to precipitate fluorine present in said wet-process phosphoric acid as potassium fluosilicate and produce clarified and substantially fluorine-free phosphoric acid, wherein said $KH_2PO_4$ is formed in-situ by reacting in a second unit (i) an amine phosphate salt with (ii) a potassium salt selected from the group consisting of KCl and $K_2SO_4$, and wherein said amine phosphate salt is formed in a third unit by reaction of (i) an amine which is present in a water-immiscible liquid system comprised of members selected from the group consisting of a primary, secondary, tertiary aliphatic amine, a quaternary ammonium base or mixtures thereof, said amine and/or quaternary ammonium base comprising at least two aliphatic hydrophobic groups each containing at least 7 carbon atoms directly attached to the nitrogen thereof, with (ii) a stoichiometric equivalent amount of a portion of the clarified and substantially fluorine-free phosphoric acid produced in said first unit.

2. A method according to claim 1, wherein the amine has a general formula $R_1 R_2 R_3 N$, in which $R_1$ and $R_2$ are saturated or ethylenically unsaturated aliphatic hydrocarbon groups, each having from 7 to 15 carbon atoms and $R_3$ is a hydrogen atom or a saturated or ethylenically unsaturated aliphatic hydrocarbon group containing from 1 to 18 carbon atoms.

3. A method according to claim 2, wherein the amine is admixed with a substantially water-immiscible organic diluent.

4. A method according to claim 3, wherein the organic diluent comprises a polar additive to increase the solubility of the amine or the salts thereof in the organic diluent.

5. A method according to claim 1, wherein the amount of amine is calculated according to the fluorine content of the WPA resulting in defluorinated products.

6. A method according to claim 5, wherein the amount of amine is calculated according to the fluorine and sulfate contents of the WPA resulting in the production of substantially fluorine-free and desulfated phosphoric acid in said first unit.

7. A method according to claim 1, wherein additives to improve the colour of phosphoric acid and to precipitate impurities selected from the group consisting of active carbon, active silica and calcium hydroxide are added to the WPA with the $KH_2PO_4$ for the precipitation of potassium fluosilicate.

8. A method according to claim 1, wherein the concentration of the WPA is between 20 to 54% by wt $P_2O_5$.

9. A method according to claim 1, wherein part of the clarified and substantially fluorine-free phosphoric acid is transformed into feed grade dicalcium phosphate by neutralization with $Ca(OH)_2$, $CaCO_3$ or mixtures thereof.

10. A method according to claim 1, wherein part of the clarified and substantially fluorine-free phosphoric acid is transformed into feed-grade dicalcium phosphate and the balance is refined to food-grade phosphoric acid using solvent extraction techniques.

11. A method according to claim 1, wherein part of the clarified and substantially fluorine-free phosphoric acid is transformed into feed-grade dicalcium phosphate and the balance is transformed into high grade pure phosphates using solvent extraction techniques.

* * * * *